(12) United States Patent
Marra et al.

(10) Patent No.: US 10,191,927 B2
(45) Date of Patent: Jan. 29, 2019

(54) SELECTING PREVIOUSLY-PRESENTED CONTENT ITEMS FOR PRESENTATION TO USERS OF A SOCIAL NETWORKING SYSTEM

(71) Applicant: Facebook, Inc., Menlo Park, CA (US)

(72) Inventors: Gregory Matthew Marra, San Francisco, CA (US); Yi Guo, Sunnyvale, CA (US); Chao Ruan, Sunnyvale, CA (US); Li Zhang, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/243,739

(22) Filed: Apr. 2, 2014

(65) Prior Publication Data
US 2015/0286662 A1 Oct. 8, 2015

(51) Int. Cl.
*G06F 17/30* (2006.01)

(52) U.S. Cl.
CPC .... *G06F 17/30321* (2013.01); *G06F 17/3053* (2013.01)

(58) Field of Classification Search
CPC ......... G06F 17/03864; G06F 17/30321; G06F 17/30613
USPC .... 707/741, 754, 769, 723, 5, 726, 749, 797
See application file for complete search history.

(56) References Cited

U.S. PATENT DOCUMENTS

| | | | | |
|---|---|---|---|---|
| 8,005,827 | B2 * | 8/2011 | Fassett | G06F 17/30743 707/722 |
| 8,332,512 | B1 * | 12/2012 | Wu | G06Q 30/0254 705/319 |
| 8,938,500 | B1 * | 1/2015 | Acharya | G06Q 50/01 705/319 |
| 9,117,227 | B1 * | 8/2015 | Agrawal | G06Q 30/0242 |
| 9,684,929 | B1 * | 6/2017 | Shapiro | G06Q 30/08 |
| 2004/0030741 | A1 * | 2/2004 | Wolton | G06F 17/30873 709/202 |
| 2004/0260621 | A1 * | 12/2004 | Foster | G06Q 30/02 705/26.62 |
| 2009/0006388 | A1 * | 1/2009 | Ives | G06F 17/30864 |
| 2009/0234861 | A1 * | 9/2009 | Ramer | G06F 17/30749 |
| 2009/0300008 | A1 * | 12/2009 | Hangartner | G06F 17/30053 |
| 2010/0169342 | A1 * | 7/2010 | Kenedy | G06F 17/30867 707/758 |
| 2010/0191773 | A1 * | 7/2010 | Stefik | G06Q 10/10 707/797 |

(Continued)

*Primary Examiner* — Jeff A Burke
*Assistant Examiner* — Thong Vu
(74) *Attorney, Agent, or Firm* — Fenwick & West LLP

(57) ABSTRACT

A social networking system selects content items previously presented to a user for presentation to the user along with content items that were not previously presented. The social networking system selects candidate content items as previously-presented content items satisfying one or more criteria. One or more indices each associated with one or more attributes are generated that include candidate content items having attributes associated with an index. Candidate content items in an index are ranked based on a likelihood of the user interacting with the candidate content items in the index, and one or more candidate content items are selected from the index for presentation based on the ranking. The candidate content items selected from the index are presented to the user along with additional content items not previously-presented to the user.

20 Claims, 3 Drawing Sheets

(56) References Cited

U.S. PATENT DOCUMENTS

| | | | |
|---|---|---|---|
| 2011/0078726 A1* | 3/2011 | Rosenberg | G06Q 30/02 725/34 |
| 2011/0213786 A1* | 9/2011 | Wu | G06Q 30/02 707/749 |
| 2012/0054246 A1* | 3/2012 | Fischer | G06Q 10/06 707/793 |
| 2012/0166532 A1 | 6/2012 | Juan et al. | |
| 2012/0191715 A1* | 7/2012 | Ruffner | G06F 17/30011 707/738 |
| 2012/0290606 A1* | 11/2012 | Kumar | G06F 17/30867 707/769 |
| 2012/0331063 A1 | 12/2012 | Rajaram et al. | |
| 2013/0013379 A1* | 1/2013 | Carter | G06Q 10/06 705/7.39 |
| 2013/0024448 A1* | 1/2013 | Herbrich | G06F 17/30864 707/728 |
| 2013/0212173 A1* | 8/2013 | Carthcart | G06Q 50/01 709/204 |
| 2014/0075275 A1* | 3/2014 | Aleksandrovsky | G06F 17/2229 715/202 |
| 2014/0122456 A1* | 5/2014 | Dies | G06F 17/30707 707/706 |
| 2014/0156360 A1 | 6/2014 | Shalita et al. | |
| 2014/0156566 A1 | 6/2014 | Kabiljo et al. | |
| 2014/0156681 A1* | 6/2014 | Lee | G06F 17/30867 707/754 |
| 2014/0156744 A1 | 6/2014 | Hua et al. | |
| 2014/0172875 A1* | 6/2014 | Rubinstein | G06F 17/30867 707/748 |
| 2014/0180826 A1* | 6/2014 | Boal | G06Q 30/0245 705/14.66 |
| 2014/0222802 A1* | 8/2014 | Yan | G06F 17/30554 707/727 |
| 2014/0244655 A1* | 8/2014 | Attwell | G06F 17/30321 707/741 |
| 2014/0280121 A1* | 9/2014 | Sharp | G06F 17/3053 707/732 |
| 2014/0280185 A1* | 9/2014 | Nordstrom | G06F 17/30321 707/741 |
| 2014/0288932 A1* | 9/2014 | Yeracaris | G10L 15/30 704/249 |
| 2014/0317732 A1* | 10/2014 | Beaufrere | H04L 63/1441 726/22 |
| 2015/0026187 A1* | 1/2015 | Ballou | G06F 17/30321 707/741 |
| 2015/0100570 A1* | 4/2015 | Zent | G06F 17/3053 707/723 |

\* cited by examiner

SELECTING PREVIOUSLY-PRESENTED CONTENT ITEMS FOR PRESENTATION TO USERS OF A SOCIAL NETWORKING SYSTEM

BACKGROUND

This disclosure relates generally to social networking systems, and in particular to presenting content items to a social networking system user.

A social networking system allows its users to connect to and communicate with other social networking system users. Users may create profiles on a social networking system that are tied to their identities and include information about the users, such as interests and demographic information. The users may be individuals or entities such as corporations or charities.

A social networking system allows its users to post content to the social networking system for presentation to other social networking system users, allowing the users interact with each other. Examples of content items include stories, photos, videos, and invitations. Additionally, the social networking system typically generates content items describing actions performed by users and identified by the social networking system. For example, a content item is generated when a user of a social networking system checks into a location, shares content posted by another user, or performs any other suitable interaction. The social networking system presents content items describing an action performed by a user is presented to an additional user connected to the user via the social networking system. Typically, the social networking system presents content items to users in a feed in an order based on times when content items are generated or received by the social networking system. For example, a feed chronologically presents content items to a user with more recently generated content items presented in more visible locations when presented to a user.

Over time, a large number of content items may be presented to a user by the social networking system. Certain content items previously presented to a user may be relevant to the user at a time after they were initially presented. For example, content items associated with recurring events such as a birthday or a holiday become relevant to a user each year. However, in conventional social networking systems, a user may expend significant time navigating through multiple content items to identify a previously presented content item.

SUMMARY

A social networking system retrieves content items previously presented to a user and identifies candidate content items for subsequent presentation to a viewing user of the social networking system. In one embodiment, the social networking system identifies candidate content items as previously presented content items satisfying one or more criteria. Example criteria include: association with a specific date, association with a specified topic, association with an event (e.g., a birthday, a holiday, an anniversary), and association with a date within a threshold time of a current time. One or more rules may be applied to the retrieved content items to exclude content items having specified attributes from being identified as candidate content items. Example rules include excluding previously presented content items associated with negative content, excluding previously presented content items associated with offensive content, excluding previously presented content items associated with malicious content, excluding previously presented content items associated with a specified ratio of different types of interactions (e.g., associated with more comments than indications of preference), and excluding previously presented content items associated with types of users (e.g., users that have not interacted with the social networking system for at least a threshold length of time, users that were previously connected to the user but are not currently connected to the user, etc.).

From the candidate content items, the social networking system generates one or more indices each including one or more candidate content items. Each index is associated with one or more attributes, so candidate content items included in an index have the one or more attributes associated with the index. Example attributes associated with an index include: a time when content items were created, events associated with content items (e.g., user-specific events, recurring events), topics, a user associated with content items, etc. For example, an index includes candidate content items associated with a viewing user, an index includes candidate content items associated with a holiday, an index includes candidate content items associated with a topic. However, an index may include candidate content items associated with any suitable attribute.

In one embodiment, candidate content items are ranked based a number of interactions associated with the candidate content items, and the one or more indices are generated based at least in part on the ranking. For example, candidate content items are ranked based on a number of various types of interactions associated with the content items, with different types of interactions associated with various weights. Candidate content items having at least a threshold position in the ranking are used to generate the one or more indices Candidate content items included in one or more indices are ranked for presentation to a viewing user of the social networking system based on a likelihood of the viewing user interacting with the candidate content items. For example, candidate content items in an index are ranked based on an expected level of interaction by the viewing user with various content items in the index. Example factors for determining an expected level of interaction with a candidate content item include: age of the candidate content item, likelihoods that the viewing user performs different types of interactions with the content item, a time period during which the candidate content item may be presented, a number of previously presented content items again presented to the viewing user within a threshold time interval of a current time, a length of time from a current time to a time when a previously presented content item was again presented to the viewing user, and a relationship between the viewing user and the candidate content item.

Based on the ranking, one or more candidate content items from the index are selected for presentation to the viewing user. The selected candidate content items are presented along with additional content items that have not previously been presented to the viewing user. The selected candidate content items are presented along with additional content items that have not previously been presented to the viewing user. Candidate content items may be distinguished from content items that have not previously been presented to the viewing user. For example, the date when a candidate content item was created or was first presented to the viewing user is presented along with the candidate content item. Text identifying a date when the candidate content item was created or was originally presented to the viewing user is displayed along with the candidate content item. In some embodiment, the frequency with which previously presented content items are again presented or the number of times previously presented content items are again presented to the viewing user may be limited. For example, the social networking system includes one or more rules limiting subsequent presentation of a previously presented content item to once per day or once for a specified number of content items that have not previously been presented to the viewing user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
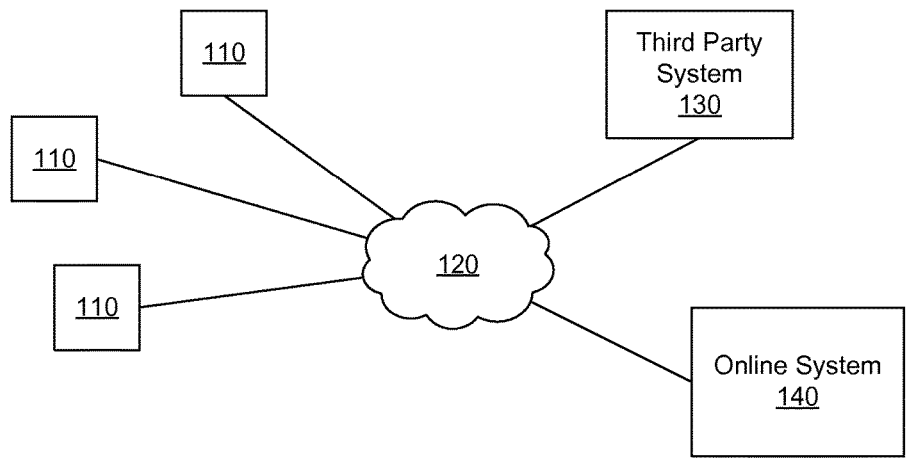
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
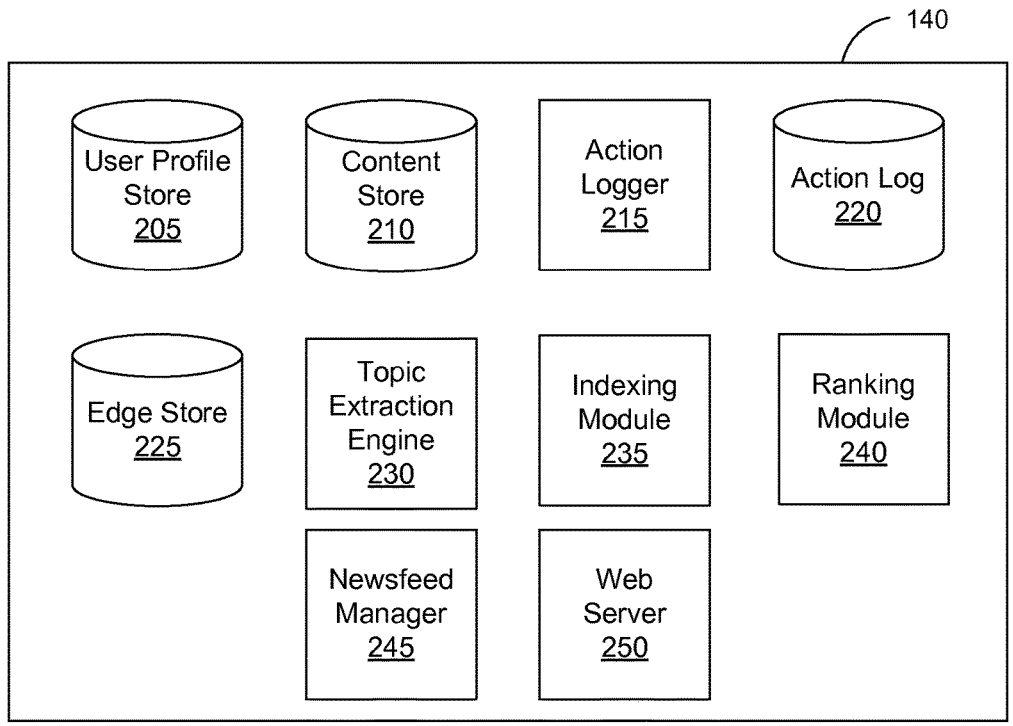
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a topic extraction engine 230, an indexing module 235, a ranking module 240, a newsfeed manager 245, and a web server 250. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140. In one embodiment, the content store 210 includes one or more user identifiers that identify one or more social networking system users presented with a content item that are stored in association with the stored content item. In some embodiments, the content store 210 also stores values associated with the stored content items that indicate an amount or fraction of the content items were presented to the user. The content store 210 may also store time values associated with the stored content items indicating a duration a content item was presented to a user.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The social networking system 140 includes a topic extraction engine 230, which identifies one or more topics associated with objects in the content store 210. To identify topics associated with content items, the topic extraction engine 230 identifies anchor terms included in a content item and determines a meaning of the anchor terms as further described in U.S. application Ser. No. 13/167,701, filed Jun. 24, 2011, which is hereby incorporated by reference in its entirety. For example, the topic extraction engine 230 determines one or more topics associated with a content item maintained in the content store 210. The one or more topics associated with a content item are stored and associated with an object identifier corresponding to the content item. In various embodiments, associations between object identifiers and topics are stored in the topic extraction engine 230 or in the content store 210 to simplify retrieval of one or more topics associated with an object identifier or retrieval of object identifiers associated with a specified topic. Structured information associated with a content item may also be used to extract a topic associated with the content item.

The indexing module 235 identifies candidate content items from content items previously presented by the social networking system 140. Previously-presented content items satisfying one or more criteria are identified as candidate content items. Examples of criteria for identifying candidate content items include: association with a recurring event (e.g., the Olympics), association with one or more specified topics (e.g., New York Fashion Week, a music genre, etc.), association with a recurring event associated with the viewing user (e.g., anniversaries, birthdays, holidays), association with isolated events (e.g., the season premiere of a television show), and association with a time (e.g., a time the content item was generated). In various embodiments, a content item previously presented by the social networking system 140 (a "previously-presented content item") is a content item that was presented to the user via a client device 110, rather than a content item that was merely communicated to the client device 110; for example, a previously-presented content item is a content item that was shown on a display of the client device 110 for at least at threshold amount of time rather than a content item that was communicated to a client device 110 and not shown on the display of the client device 110. Moreover, in some embodiments, indexing module 235 may determine whether a content item were previously-presented to the user based on whether at least a threshold fraction of the content item was presented to the user (e.g., shown on a display of a client device) or whether a threshold fraction of the content item was presented for at least a threshold duration by a client device.

In some embodiments, the indexing module 235 also includes one or more rules that exclude certain previously-presented content items from being identified as candidate content items. Example rules excludes previously-presented content items from identification as a candidate content item include: a rule excluding content items associated with malicious, negative, or offensive content (e.g., content items including the words "sorry," "condolences," "R.I.P."), a rule excluding content items associated with malicious, negative, or offensive tags (e.g., tags specifying "sad," "terrorist"), a rule excluding content items associated with a user of the social networking system to which the viewing user is no longer connected via the social networking system 140, a rule excluding content items associated with a user that has not interacted with the social networking system 140 within a threshold period of time (e.g., a former user of the social networking system), and a rule excluding content items associated with a specified ratio of different types of interactions performed by social networking system users (e.g., content items associated with a greater number of comments than indications of user preference). However, the indexing module 235 may use any suitable rules for excluding previously-presented content items from selection as a candidate content item in various embodiments.

Based on attributes associated with the candidate content items, the indexing module 235 generates indices each including one or more candidate content items. Example attributes associated with candidate content items and used to generate an index include: a time the candidate content items were created, an event associated with the candidate content items, and a topic associated with candidate content items. Events associated with candidate content items may be associated with the viewing user (e.g., birthdays, anniversaries, etc.) or may be associated with multiple social networking system users (e.g., holidays). Different indices may be generated for different time periods. For example, a daily index assigns candidate content items to indices associated with individual days. As a specific example, if a user's birthday falls on October $30^{th}$, content items associated with the user's birthday and autumn are assigned to an index generated for the day October $30^{th}$ while content items associated with Halloween and autumn are assigned to an index generated for the day October $31^{st}$. As an additional example of an index, a monthly index assigns candidate content items to indices corresponding to different months. As a specific example of a monthly index, content items associated with Thanksgiving are assigned to an index generated for November while content items associated with Christmas and New Year's Eve are assigned to an index generated for December.

The ranking module 240 ranks candidate content items in an index based on a likelihood of the viewing user interacting with a candidate content item. Various factors may be used to determine the likelihood of the viewing user interacting with the candidate content item. In one embodiment, prior interactions by the viewing user with other content items are used to determine the likelihood of the viewing user interacting with a candidate content item. For example, based on a user's historical interactions with content items, the ranking module 240 determines likelihoods that the viewing user performs different types of interactions with a candidate content item (e.g., indicate a preference for a candidate content item, share a candidate content item with another social networking system user, comment on a candidate content item, etc.). Different types of interactions with a candidate content items may be associated with different weights, allowing different types of user interactions to differently affect the ranking of a candidate content item. Additionally, a time period when a candidate content item is to be presented to the viewing user may affect the likelihood of a user interacting with the candidate content item. For example, the likelihood of a user interacting with the candidate content item may be increased if the candidate content item is associated with an event associated with a time that is within a threshold time interval from a current time.

In various embodiments, the ranking module 240 may use additional factors to determine the likelihood of the viewing user interacting with a candidate content item. Examples of additional factors for determining the likelihood of the viewing user interacting with a candidate content item include: a number of previously-presented content items that were again presented to the viewing user within a threshold length of time, a time when another previously-presented content item was presented to the viewing user, an age of a candidate content item, and a type of connection between a user associated with the candidate content item and the viewing user. For example, a likelihood of the viewing user interacting with the candidate content item is reduced if the candidate content item has greater than a threshold age. As an additional example, the likelihood of a viewing user interacting with a candidate content item associated with a user having a connection to the viewing user indicating the viewing user and the user are family is increased relative to an additional candidate content item associated with an additional user connected to the viewing user by a connection indicating the viewing user and the additional user are coworkers.

In one embodiment, the social networking system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 245 may generate stories for presentation to a user based on information in the action log 220 and in the edge store 225 or may select candidate stories included in content store 210. One or more of the candidate stories are selected and presented to a user by the newsfeed manager 245.

For example, the newsfeed manager 245 receives a request to present one or more stories to a social networking system user. The newsfeed manager 245 accesses one or more of the user profile store 205, the content store 210, the action log 220, and the edge store 225 to retrieve information about the identified user. For example, stories or other data associated with users connected to the identified user are retrieved. The retrieved stories or other data are analyzed by the newsfeed manager 245 to identify content likely to be relevant to the identified user. For example, stories associated with users not connected to the identified user or stories associated with users for which the identified user has less than a threshold affinity are discarded as candidate stories. Based on various criteria, the newsfeed manager 245 selects one or more of the candidate stories for presentation to the identified user.

In various embodiments, the newsfeed manager 245 presents stories to a user through a newsfeed including a plurality of stories selected for presentation to the user. The newsfeed may include a limited number of stories or may include a complete set of candidate stories. The number of stories included in a newsfeed may be determined in part by a user preference included in the user profile store 205. The newsfeed manager 245 may also determine the order in which selected stories are presented via the newsfeed. For example, the newsfeed manager 245 determines that a user has a highest affinity for a specific user and increases the number of stories in the newsfeed associated with the specific user or modifies the positions in the newsfeed where stories associated with the specific user are presented.

The newsfeed manager 245 may also account for actions by a user indicating a preference for types of stories and selects stories having the same or similar types for inclusion in the newsfeed. Additionally, the newsfeed manager 245 may analyze stories received by the social networking system 140 from various users to obtain information about user preferences or actions from the analyzed stories. This information may be used to refine subsequent selection of stories for newsfeeds presented to various users.

The web server 250 links the social networking system 140 via the network 120 to the one or more client devices 110, as well as to the one or more third party systems 130. The web server 250 serves web pages, as well as other content, such as JAVA®, FLASH®, XML and so forth. The web server 250 may receive and route messages between the social networking system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or BlackberryOS.

Figure 3:
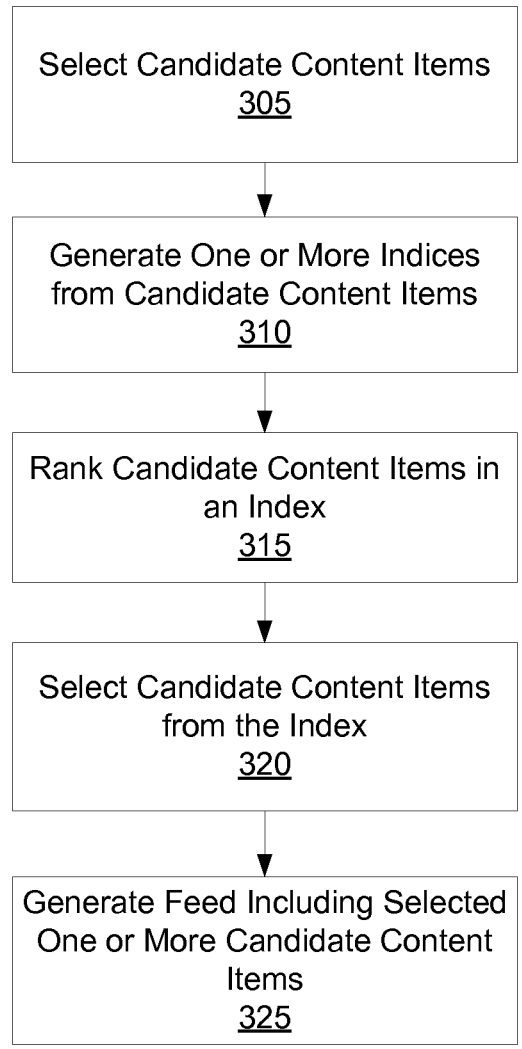
FIG. 3 is a flow chart of a method for indexing content items for presentation in a feed of content, in accordance with an embodiment.

Indexing Previously-Presented Content Items for Presentation in a Feed of Content FIG. 3 is flow chart of a method for indexing content items for presentation in a feed of content. The social networking system 140 selects 305 candidate content items from stored content items. The social networking system 140 stores content items and times associated with the stored content items in the content store 210. For example, a time associated with a stored content item indicates a time when the stored content item was presented to a social networking system user. Thus, previously-presented content items are content items that were presented to the user by a client device 110. In some embodiments, the social networking system 140 stores values associated with the stored content items that represent a fraction of different content items presented to the user via a display device 110 or other output device of the client device 110. If a content item's associated value is above a threshold (e.g., 60%), the content item is determined to have been previously-presented to the user. In some embodiments, determination of whether a content item has been previously presented may be based on a combination of the fraction of the content item presented and a duration that the fraction of the content item was presented to the user.

Additionally, user identifiers of one or more users presented with a content item are stored in association with the content item. From the stored content items, the social networking system 140 selects 305 content items previously presented to a social networking system user and satisfying one or more criteria as candidate content items. In one embodiment, the social networking system 140 selects 305 content items previously presented to a viewing user and satisfying one or more criteria as candidate content items. For example, stored content items previously presented to the viewing user and associated with a specified topic or associated with an event are selected 305 as candidate content items.

In some embodiments, one or more rules are applied to stored previously-presented content items to exclude certain content items from selection as candidate content items. For example, rules exclude previously-presented content items from candidacy if the content items are associated with malicious, negative, or offensive content or tags, are associated certain users (e.g., users to which the viewing user is no longer connected, users that have not interacted with the social networking system 140 for at least a threshold period of time, etc.), or are associated with a ratio of different types of actions performed by one or more users of the social networking system. For example, previously-presented content items including certain words that indicate their content is sad (e.g., "sorry,") or offensive (e.g., racial slurs) and previously-presented content items associated with certain users (e.g., users who are now deceased) are excluded from candidacy. As another example, previously-presented content items associated with a greater number of comments than indications of user preference are excluded from selection as candidate content items.

The social networking system 140 generates one or more indices from the candidate content items. Each index is associated with one or more attributes of content items, so candidate content items in an index have attributes associated with the index. Examples of attributes associated with an index include a time a candidate content item was generated, an event associated with a candidate content item, a topic associated with a candidate content item, or any other suitable information associated with a candidate content item. For example, an index including candidate content items associated with a specific day is generated 310. Different indices may be associated with different time periods. For example, a daily index includes candidate content items associated with a specified day, while a yearly index includes candidate content items associated with a particular year. As an additional example, an index may include candidate content items associated with a specified event or topic.

In one embodiment, candidate content items are ranked based on a number of interactions associated with the candidate content items, and the one or more indices are generated 310 based at least in part on the ranking. Interactions performed by various social networking system users are used to rank the candidate content items are performed by various social networking system users, so the ranking accounts for global interactions with candidate content items across social networking system users. For example, candidate content items are ranked based on a number of various types of interactions associated with the content items (e.g., sharing a candidate content item, indicating a preference for a candidate content item, commenting on a candidate content item), with different types of interactions associated with various weights. The types of interactions are modified by their associated weights to generate the ranking, and candidate content items having at least a threshold position in the ranking are used to generate 310 the one or more indices.

Candidate content items in an index are ranked 315 based on likelihoods of the viewing user interacting with each candidate content items in the index. For example, on October 31$^{st}$, the social networking system 140 ranks 315 content items included in an index 400 associated with "Halloween" or included in an index associated with "October 31$^{st}$." Prior interactions between the viewing user and other content items may be retrieved from the action log 220 and used to determine the likelihood of the viewing user interacting with a candidate content item. For example, different types of interactions by the viewing user with other content items are identified and values are determined for various types of interactions to determine the likelihood of the viewing user interacting with a candidate content item.

Additional factors may modify the determination of the viewing user's likelihood of interacting with a candidate content item. For example, the likelihood of a viewing user interacting with a candidate content item may be modified based on various characteristics of the candidate content item. Example characteristics of a candidate content item modifying the likelihood of the viewing user interacting with the candidate content item include: age of the candidate content item, time when the candidate content item is to be presented, a number of previously-presented content items again presented to the viewing user, and a time when the viewing user was again presented with a previously-presented content item. Additionally, a type of connection between the viewing user and a user associated with the candidate content item may affect the likelihood of the viewing user interacting with the candidate content item. In one embodiment, prior interactions between the viewing user and other content items associated with a user associated with the candidate content item modify the likelihood of the viewing user interacting with the candidate content item. For example, the likelihood of the viewing user interacting with a candidate content item is increased if the viewing user has interacted with at least a threshold number of additional content items associated with a user associated with the candidate content item One or more candidate content items in the index are selected 320 based on the ranking for presentation to the viewing user. For example, candidate content items in an index having at least at threshold position in the ranking are selected 320. The social networking system 140 generates 325 a feed of content for presentation to the viewing user that includes one or more of the selected candidate content items and candidate content items that have not previously been presented to the viewing user. For example, content items that have not previously been presented to the viewing user describe actions performed by other users connected to the viewing user. The selected candidate content items and content items that have not previously been presented to the viewing user may be ranked based on the likelihood of the viewing user interacting with the candidate content items and with the content items that were not previously presented. Based on the ranking of the selected candidate content items and the content items that have not been previously presented, the feed is generated 325, with the order of the selected candidate content items and the content items that have not previously been presented determined in part on the ranking of the selected candidate content items and the content items that have not previously been presented to the viewing user. The selected candidate content items may be visually distinguished from content items that have not been previously presented to the viewing user. For example, a heading is displayed along with a selected candidate content item in the feed indicating a time the selected candidate content item was generated, and may identify a reason the selected candidate content item is included in the feed.

In some embodiments, the number of previously-presented content items included in the generated feed or the frequency with which previously-presented content items are included in the feed is limited by rules maintained by the social networking system 140. For example, stored rules limit the feed to including a previously-presented content item once during a specified time interval or to including a previously-presented content item with a specified number of content items that were not previously presented to the viewing user. The generated feed is communicated to a client device 110 for presentation to the viewing user.

Figure 4:
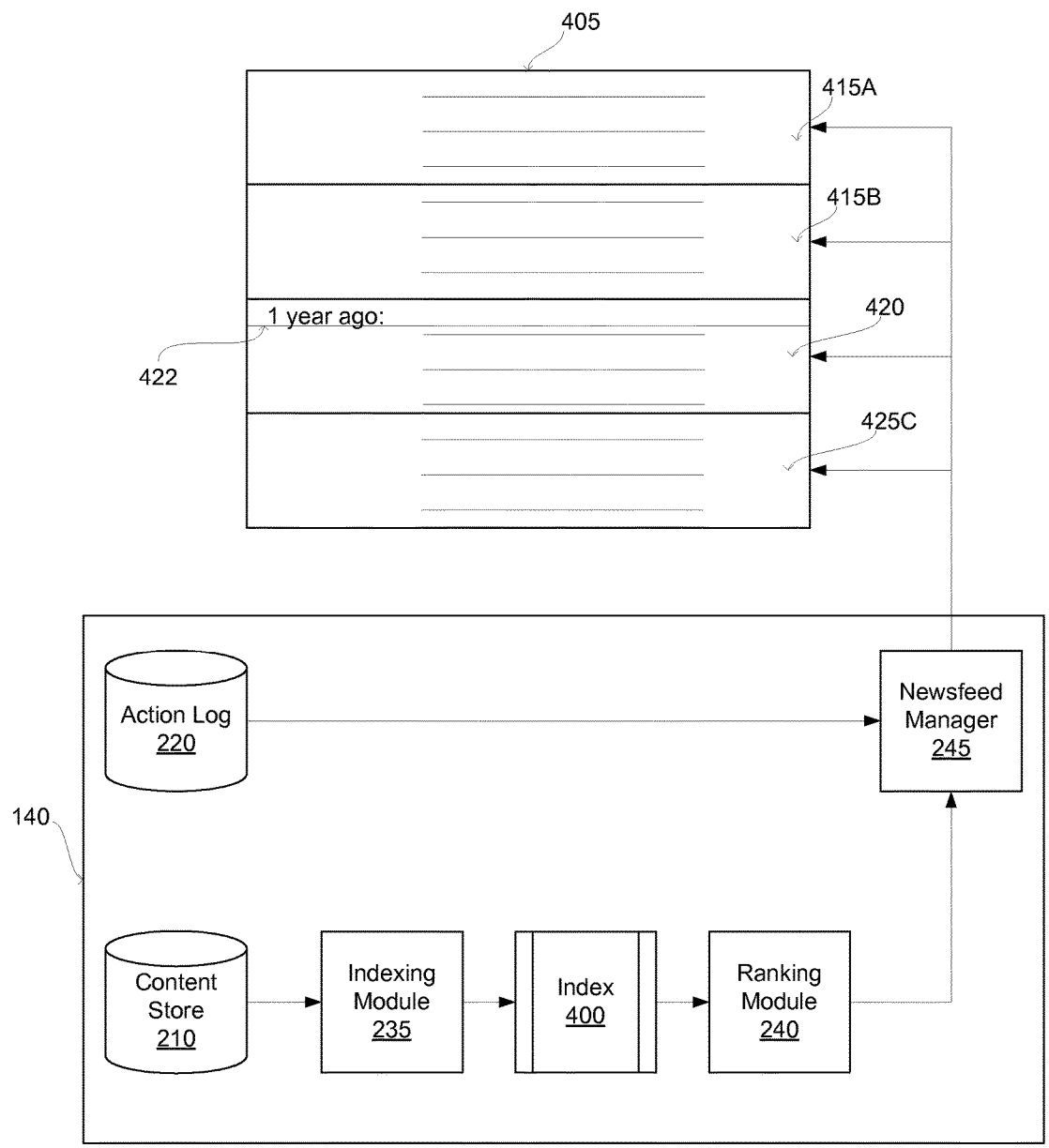
FIG. 4 is a process flow diagram for generating a feed of content including previously-presented content items and additional content items, in accordance with an embodiment.

FIG. 4 is a process flow diagram one embodiment of a method for generating a feed including content items previously-presented to a user of the social networking system 140 and additional content items. The indexing module 235 identifies candidate content items previously presented to the user and satisfying one or more criteria from the content store 210 and generates one or more indices 400 that each include one or more candidate content items. For example, an index 400 including candidate content items associated with a specific day is generated by the indexing module 235. The ranking module 240 ranks the candidate content items in an index 400 based on likelihoods of the viewing user interacting with various candidate content items in the index 400. Historical interactions between the viewing user and other content items may be retrieved from the action log 220 and used to determine the likelihood of the viewing user performing different types of interactions with candidate content items in the index 400, with the candidate content items in the index ranked based on their associated likelihoods.

One or more candidate content items from the index are selected by the ranking module 240 and communicated to the newsfeed manager 245, which also generates content items describing actions performed by other users connected to the viewing user based on information in the action log 220. The newsfeed manager 245 generates a feed 405 including content items that have not previously been presented to the viewing user 415A, 415B, 415C and one or more of the selected candidate content items 420, which are content items previously presented to the viewing user. A selected candidate content item 420 included in the feed 405 may be visually distinguished from content items that have not previously been presented to the viewing user 415A, 415B, 415C. For example, a heading 422 is displayed along with the selected candidate content item 420 in the feed 405 indicating a time the selected candidate content item 420 was generated, and may identify a reason the selected candidate content item 420 is included in the feed 405.

Prior interactions with the selected candidate content item 420 may be presented in the feed 405 along with the selected candidate content item 420. For example, a number of various types of interactions associated with the selected candidate content item 420 are presented (e.g., a number of comments, a number of indications of preference, etc.). A description of an interaction by a user connected to the viewing user with the selected candidate content item 420 may also be presented. For example, an identification of a user connected to the viewing user, a type of interaction by the user with the candidate content item, and a date when the user performed the interaction may be presented along with the selected candidate content item 420.

Summary

The foregoing description of the embodiments have been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A method comprising:
presenting a plurality of content items stored by a social networking system within one or more feeds of a set of feeds associated with one or more users of the social networking system, each content item presented within a feed corresponding to a user and associated with a time when it is presented within the feed;
selecting candidate content items from the plurality of presented content items, the selected candidate content items including at least one candidate content item representing a story;
generating one or more indices using the selected candidate content items, each generated index associated with one or more candidate content items having one or more attributes associated with the index;
  ranking a first one or more candidate content items in an index, the ranking based at least in part on an expected level of interaction by a viewing user different from the one or more users, of the one or more users, with each of the first one or more candidate content items in the index, wherein ranking the first one or more candidate content items in the index further comprising:
    determining values associated with each candidate content item in the index, wherein, for at least one candidate content item in the index, a plurality of values are determined for the candidate content item, each value of the plurality of values representing a likelihood that the viewing user is going to perform a different type of interaction of a plurality of types of interactions with the candidate content item; and
    ranking the first one or more candidate content items in the index based at least in part on the determined values, further comprising:
      modifying the determined values associated with the first one or more candidate content items in the index based on one or more characteristics of the first one or more candidate content items; and
      ranking the first one or more candidate content items in the index based at least in part on the modified determined values;
  selecting at least one candidate content item, of the first one or more candidate content items, from the index based at least in part on the ranking; and
  generating a feed of content not included in the set of feeds, the generated feed presenting the selected candidate content items for a second time and including additional content items to the viewing user.

2. The method of claim 1, wherein selecting candidate content items from the plurality of content items comprises:
  selecting content items satisfying one or more criteria as candidate content items.

3. The method of claim 2, wherein the one or more criteria are selected from a group consisting of: association with a topic, association with an event occurring within a threshold time from a current time, association with a recurring event, association with a specified time, and any combination thereof.

4. The method of claim 1, wherein selecting candidate content items from the plurality of content items comprises:
  applying one or more rules to the plurality of content items, the one or more rules excluding content items from selection for presentation to the viewing user;
  identifying a set of content items from the plurality of content items based at least in part on the one or more rules; and
  selecting the candidate content items from the set of content items.

5. The method of claim 4, wherein the one or more rules are selected from a group consisting of: a rule excluding content items associated with malicious content, a rule excluding content items associated with offensive content, a rule excluding content items associated with negative content, a rule excluding content items associated with one or more specified tags, a rule excluding content items associated with one or more specified users of the social networking system, a rule excluding content items associated with a specified ratio of types of interactions, and any combination thereof.

6. The method of claim 1, wherein a type of interaction is selected from a group consisting of: indicating a preference for the candidate content item in the first one or more candidate content items, sharing the candidate content item in the first one or more candidate content items with an additional user of the social networking system, and commenting on the candidate content item in the first one or more candidate content items.

7. The method of claim 1, wherein a characteristic of a candidate content item is selected from a group consisting of: an age of the candidate content item, a type of connection between the viewing user and a user associated with the candidate content item, and a time associated with presentation of the candidate content item.

8. The method of claim 1, wherein the ranking is further based at least in part on a number of content items presented to the viewing user more than once within a threshold time period.

9. The method of claim 1, wherein an attribute of a candidate content item included in the index is selected from a group consisting of: an event associated with the viewing user, an event associated with an additional user connected to the viewing user, a recurring event, a topic, and a date.

10. The method of claim 1, wherein a user of the one or more users comprises a user associated with a previously removed connection to the viewing user.

11. The method of claim 1, wherein a user of the one or more users comprises a user that has not interacted with the social networking system within a threshold period of time.

12. The method of claim 1, wherein a user of the one or more users comprises a user that is not currently associated with a user profile maintained by the social networking system.

13. A computer program product comprising a computer-readable storage medium having instructions encoded thereon that, when executed by a processor, cause the processor to:
  retrieve a plurality of content items stored by a social networking system within one or more feeds of a set of feeds associated with one or more users of the social networking system, each content item presented within a feed corresponding to a user and associated with a time when it was presented within the feed;
  selecting candidate content items from the plurality of presented content items, the selected candidate content items including at least one candidate content item representing a story;
  generating one or more indices using the selected candidate content items, each generated index associated with one or more candidate content items having one or more attributes associated with the index;
  ranking a first one or more candidate content items in an index, the ranking based at least in part on an expected level of interaction by a viewing user different from the one or more users, of the one or more users, with each of the first one or more candidate content items in the index, wherein ranking the first one or more candidate content items in the index further comprising:
    determining values associated with each candidate content item in the index, wherein, for at least one candidate content item in the index, a plurality of values are determined for the candidate content item, each value of the plurality of values representing a likelihood that the viewing user is going to perform a different type of interaction of a plurality of types of interactions with the candidate content item; and
    ranking the first one or more candidate content items in the index based at least in part on the determined values, further comprising:

modifying the determined values associated with the first one or more candidate content items in the index based on one or more characteristics of the first one or more candidate content items; and ranking the first one or more candidate content items in the index based at least in part on the modified determined values;

selecting at least one candidate content item, of the first one or more candidate content items, from the index based at least in part on the ranking; and generating a feed of content not included in the set of feeds, the generated feed presenting the selected candidate content items for a second time and including additional content items to the viewing user.

14. The computer program product of claim 13, wherein the instructions to select candidate content items from the plurality of content items comprise instructions to:

select content items satisfying one or more criteria as candidate content items.

15. The computer program product of claim 14, wherein the one or more criteria are selected from a group consisting of: association with a topic, association with an event occurring within a threshold time from a current time, association with a recurring event, association with a specified time, and any combination thereof.

16. The computer program product of claim 13, wherein a type of interaction is selected from a group consisting of: indicating a preference for the candidate content item in the first one or more candidate content items, sharing the candidate content item in the first one or more candidate content items with an additional user of the social networking system, and commenting on the candidate content item in the first one or more candidate content items.

17. The computer program product of claim 13, wherein a characteristic of a candidate content item is selected from a group consisting of: an age of the candidate content item, a type of connection between the viewing user and a user associated with the candidate content item, and a time associated with presentation of the candidate content item.

18. The computer program product of claim 13, wherein a user of the one or more users comprises a user associated with a previously removed connection to the viewing user.

19. The computer program product of claim 13, wherein a user of the one or more users comprises a user that has not interacted with the social networking system within a threshold period of time.

20. The computer program product of claim 13, wherein a user of the one or more users comprises a user that is not currently associated with a user profile maintained by the social networking system.

* * * * *